US009027948B2

(12) United States Patent
Ooyama

(10) Patent No.: US 9,027,948 B2
(45) Date of Patent: May 12, 2015

(54) BRAKE-EQUIPPED WHEELCHAIR

(75) Inventor: Kei Ooyama, Akishima (JP)

(73) Assignee: France Bed Co., Ltd., Tokyo (JP)

( * ) Notice: Subject to any disclaimer, the term of this patent is extended or adjusted under 35 U.S.C. 154(b) by 121 days.

(21) Appl. No.: 13/489,839

(22) Filed: Jun. 6, 2012

(65) Prior Publication Data

US 2012/0241265 A1 Sep. 27, 2012

Related U.S. Application Data

(63) Continuation of application No. PCT/JP2011/073418, filed on Oct. 12, 2011.

(30) Foreign Application Priority Data

Nov. 24, 2010 (JP) ................................ 2010-261423
Aug. 12, 2011 (JP) ................................ 2011-176678

(51) Int. Cl.
*A61G 5/10* (2006.01)
*B62M 1/14* (2006.01)
(Continued)

(52) U.S. Cl.
CPC .............. *A61G 5/1018* (2013.01); *A61G 5/022* (2013.01); *A61G 5/1035* (2013.01); *A61G 5/1037* (2013.01); *A61G 5/14* (2013.01);
(Continued)

(58) Field of Classification Search
CPC . A61G 5/1018; A61G 5/1035; A61G 5/1037; A61G 5/10; A61G 5/08; A61G 5/1059; A61G 5/14; A61G 5/00
USPC .............................. 280/304.1, 250.1; 188/2 F
See application file for complete search history.

(56) References Cited

U.S. PATENT DOCUMENTS 3,076,678 A * 2/1963 Griffin .......................... 297/339
3,302,757 A 2/1967 Eagleson et al.
(Continued)

FOREIGN PATENT DOCUMENTS

CN 1688456 A 10/2005
CN 2794486 Y 7/2006
(Continued)

OTHER PUBLICATIONS

English translation of International Preliminary Report on Patentability (IPRP) including Written Opinion mailed Jun. 20, 2013 in parent International Application No. PCT/JP2011/073418.
(Continued)

*Primary Examiner* — Joseph Rocca
*Assistant Examiner* — Daniel Yeagley
(74) *Attorney, Agent, or Firm* — Holtz, Holtz, Goodman & Chick PC

(57) ABSTRACT

Coupling links coupled at one end to terminal ends of the working belt and rotatably coupled at the other end to the conveyance body, the coupling links being configured to rotate when the seat cushion body rotates with a front end portion thereof acting as a pivot and both end portions of the working belt move in an up-and-down direction, and a working link mechanism provided in a manner to operate in interlock with the rotation the coupling link, the working link mechanism being configured to shift a brake member in accordance with a direction of rotation of the coupling link into a state that the brake member is separated from a rear wheel to release braking, or into such a state that the brake member is brought into contact with the rear wheel to apply braking.

13 Claims, 11 Drawing Sheets

(51) Int. Cl.

| | |
|---|---|
| *A61G 5/02* | (2006.01) |
| *A61G 5/14* | (2006.01) |

(52) U.S. Cl.

CPC . *A61G2005/1054* (2013.01); *A61G 2005/1091* (2013.01)

(56) References Cited

U.S. PATENT DOCUMENTS

| | | | | |
|---|---|---|---|---|
| 3,529,700 | A * | 9/1970 | Marshall | 188/109 |
| 4,520,818 | A * | 6/1985 | Mickiewicz | 606/40 |
| 5,894,912 | A * | 4/1999 | Dobben | 188/2 F |
| 5,984,334 | A * | 11/1999 | Dugas | 280/250.1 |
| 6,454,285 | B1 * | 9/2002 | Koenig | 280/250.1 |
| 7,380,642 | B2 | 6/2008 | Müller | |
| 7,434,824 | B2 | 10/2008 | Connors et al. | |

FOREIGN PATENT DOCUMENTS

| | | | |
|---|---|---|---|
| CN | 1969786 | A | 5/2007 |
| CN | 101190158 | A | 6/2008 |
| JP | 2003-153961 | A | 5/2003 |
| JP | 2004-81720 | A | 3/2004 |
| JP | 3139882 | U | 2/2008 |
| JP | 3141048 | U * | 4/2008 |
| JP | 3155886 | U | 11/2009 |

OTHER PUBLICATIONS

International Search Report dated Nov. 22, 2011 (in English) in counterpart International Application No. PCT/JP2011/073418.

Chinese Office Action dated Apr. 24, 2014 in counterpart Chinese Application No. 201180003711.9.

* cited by examiner

BRAKE-EQUIPPED WHEELCHAIR

CROSS REFERENCE TO RELATED APPLICATIONS

This application is a Continuation application of PCT Application No. PCT/JP2011/073418, filed Oct. 12, 2011 and based upon and claiming the benefit of priority from prior Japanese Patent Applications No. 2010-261423, filed Nov. 24, 2010; and No. 2011-176678, filed Aug. 12, 2011, the entire contents of all of which are incorporated herein by reference.

BACKGROUND OF THE INVENTION

1. Field of the Invention

The present invention relates to a brake-equipped wheelchair wherein the rotation of rear wheels is prevented by brake members when a user rises from a seat section.

2. Description of the Related Art

For example, a wheelchair for nursing-care or for use by a physically handicapped person includes a conveyance body which is provided with front wheels and rear wheels, and a back section and a seat section are formed in the conveyance body. When a user sits on the seat section, the wheelchair is moved by a helper pushing the wheelchair by using handles provided on the back section, or by the user manually rotating auxiliary wheels which are provided on the outside of the rear wheels.

According to this structure, when the user rises from the seat section and gets out of the wheelchair, there may be a case that the wheelchair moves while the user is unprepared. Thus, the wheelchair is provided with a brake device, and at a time of non-use when the user gets out of the wheelchair, the brake device is engaged to prevent the wheelchair from being moved unintentionally.

As the brake device, there is known a manual brake device which is operated before the user rises from the seat section, thereby preventing the rotation of the rear wheels. However, in the case of the manual brake device, it is possible that the user forgets to operate the brake device, and the reliability is low.

This being the case, as disclosed in patent literature 1, there has recently been developed a wheelchair including a brake device which can automatically prevent, the rotation of the rear wheels when the user rises from the seat section.

CITATION LIST

Patent Literature

Patent literature 1: Japanese Utility Model Registration No. 3139882

BRIEF SUMMARY OF THE INVENTION

Technical Problem

In a brake device disclosed in patent literature 1, a seat band (working belt) is passed along a seat surface of the chair. Piston rods, which abut on the wheels of the wheelchair to apply the brake, are attached to both right and left end portions of the seat band. The piston rods are accommodated in rod holders, and are urged in a projecting direction by urging means so that the piston rods can project and retreat in the width direction of the wheelchair.

When a user sits on the seat, the piston rods retreat into tree rod holders by the seat hand the urging force of the urging means, and the braking action is released. When the user rises, the piston rods project by the urging force of the urging means and abut upon the wheels, thereby applying the braking action.

According to this structure, when the user sits, the seat band, which is passed along the seat surface of the chair, is pulled downward. On the other hand, the piston rods, which release the braking action, horizontally slide against the urging force of the urging means and retreat into the rod holders.

Specifically, the direction of the pulling force, which is produced by the seat band and pulls the piston rods, is greatly different from the slide direction in which the piston rods retreat into the rod holders. Thus, when the user sits, the sliding of the piston rods by the seat band is not smoothly performed, and the braking action is not easily released.

In addition, if the seat band is provided such that the seat band is passed along the seat surface of the chair, the length of flexure of the seat band when the user sits on the seat surface of the chair determined by the difference in height between seat surface and the seat band that is passed above the seat surface.

However, since the seat band has to be disposed at such a height that the seat band can be pushed down by the buttocks when the user sits on the seat surface, the seat band cannot be passed at a sufficiently great height, of the seat band, relative to the height of the seat surface. In short, the amount of flexure of the seat band when the user sits on the seat surface cannot sufficiently be increased.

Thus, the length of sliding of the piston rods by the seat band when the user sits on the seat surface cannot be increased. Consequently, when the seat band does not smoothly flex, such a case occurs that the piston rods do not sufficiently slide and the brake is not surely released.

Moreover, if the amount of flexure of the seat band cannot sufficiently be increased, it is possible that the piston rods fail to surely operate by the urging force of the urging means when the user rises from the seat surface. In such a case, the brake cannot smoothly be released.

The present invention aims at providing a brake-equipped wheelchair wherein moving of brake members by a working belt is smoothly performed when a user sits on a seat cushion body on a seat section or when the user rises.

Solution to Problem

The present invention is a brake-equipped wheelchair including a brake member configured to stop rotation of rear wheels, comprising:

a conveyance body including a back section and a seat section which is provided with armrest portions on both sides;

front wheels and rear wheels configured to movably support the conveyance body;

a seat cushion body provided on the seat section such that the seat cushion body is rotatable, with a front end portion thereof acting as a pivot;

a working belt having an intermediate portion disposed on a lower surface side of the seat cushion body;

guide sections provided on the armrest portions and configured to guide both end portions of the working belt downward from both outer sides of the conveyance body;

resilient members coupled at one end to terminal ends of the working belt and coupled at the other end to parts below the armrest portions of the conveyance body, the resilient members being configured to resiliently pull both end portions of the working belt downward;

coupling links coupled at one end to the terminal ends of the working belt and rotatably coupled at the other end to the conveyance body, the coupling links being configured to rotate in accordance with rotation of the seat cushion body when the seat cushion body rotates with a front end portion thereof acting as a pivot and both end portions of the working belt move in an up-and-down direction; and a working link mechanism provided in a manner to operate in interlock with the rotation of the coupling link, the working link mechanism being configured to shift the brake member in accordance with a direction of rotation of the coupling link into a state that the brake member is separated from the rear wheel to release braking, or into such a state that the brake member is brought into contact with the rear wheel to apply braking.

Advantageous Effects of Invention

According to the invention, both end portions of a working belt, which includes an intermediate portion disposed on a lower surface side of a seat cushion body, are guided downward of a conveyance body from guide sections of guide bodies which are provided on armrest portions. By the shifting of the working belt, working link mechanism is actuated via a coupling link. Thereby, the brake state of rear wheels by the brake members is released, or the brake is applied.

Thus, when a user sits on the seat cushion body, which is provided on the seat section such that the seat cushion body is rotatable with a front end portion thereof acting as pivot, and the working belt is pulled against a restoring force of resilient members coupled to both ends of the working belt, or when the user rises from the seat cushion body and the working belt is pulled by the restoring force of the resilient members, the direction of movement of the working belt can be made closer to the direction of rotation of the seat cushion body.

When the direction of movement of the working belt becomes closer to the direction of rotation of the seat cushion body, the working belt smoothly moves along the guide sections, and the brake members move in interlock with the movement of the working belt. Therefore, the brake by the brake members can smoothly be released or applied.

Furthermore, since the shift of the working belt is transmitted to the working link mechanism via the coupling link and the brake member is shifted by the operation of the working link mechanism, the brake member can surely be operated.

DETAILED DESCRIPTION OF THE INVENTION

Embodiments of the invention will now be described with reference to the accompanying drawings.

Example 1

Figure 1:
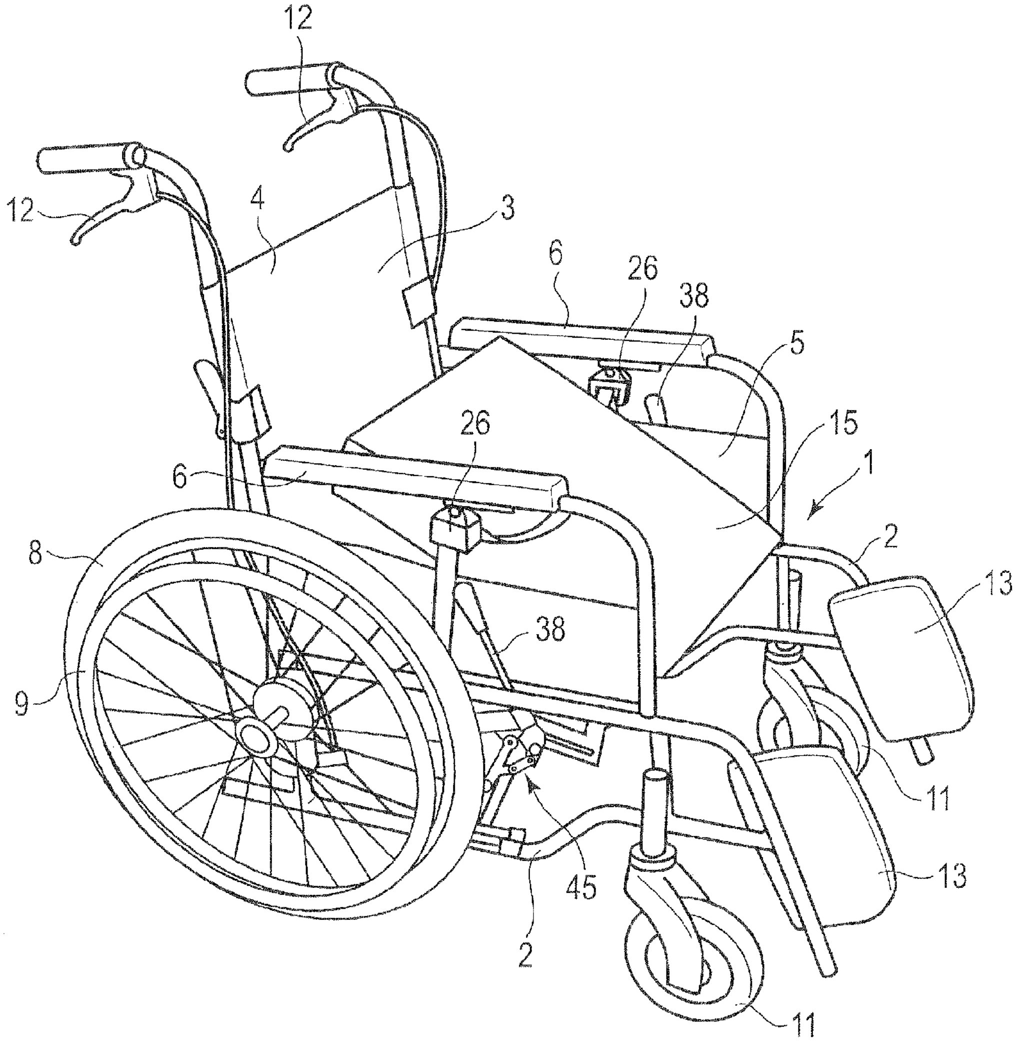
FIG. 1 is a perspective view of a wheelchair according to a first embodiment of the invention.

FIG. 1 to FIG. 10 show a first embodiment of the invention. FIG. 1 is a perspective view showing brake-equipped wheelchair. This wheelchair includes a conveyance body 1. The conveyance body 1 is constructed such that a pair of side frames 2, which are formed of pipe materials, are coupled with a predetermined distance. A cloth sheet 3 is provided between the side frames 2. Thereby, a back section 4 and a seat section 5 are formed in the conveyance body 1. Further, armrest portions 6 are formed on both sides of the seat section 5.

The sheet 3 includes a part provided on the back section 4 and a part provided on the seat section 5, which are divided at a part corresponding to a lower end of the back section 4 and a rear end of the seat section 5.

A pair of rear wheels 8 (only one rear wheel is illustrated) are rotatably provided at rear end portions on both sides of the conveyance body 1. Auxiliary wheels 9, which are smaller in diameter than the rear wheels 8, are integrally provided on outer surfaces of the rear wheels 8. Further, a pair of front wheels 11 are provided at front end portions on both sides of the conveyance body 1, such that the front wheels 11 are rotatable about a horizontal axis and a vertical axis. Thereby, the wheelchair can move and turn.

Upper end portions of the back section 4 are bent rearward, and the bent portions are provided with brake handles 12 for manually braking the rear wheels 8. Further, footrest plates 13, on which a user puts the feet when sitting on the seat section 5, are provided on both sides of a front-side lower end portion of the seat section 5 of the conveyance body 1 in such a manner that the footrest plates 13 are rotatable in the width direction of the conveyance body 1. When the footrest plates 13 have fallen inward in the width direction, the footrest plates 13 can be held in the horizontal state.

Figure 3:
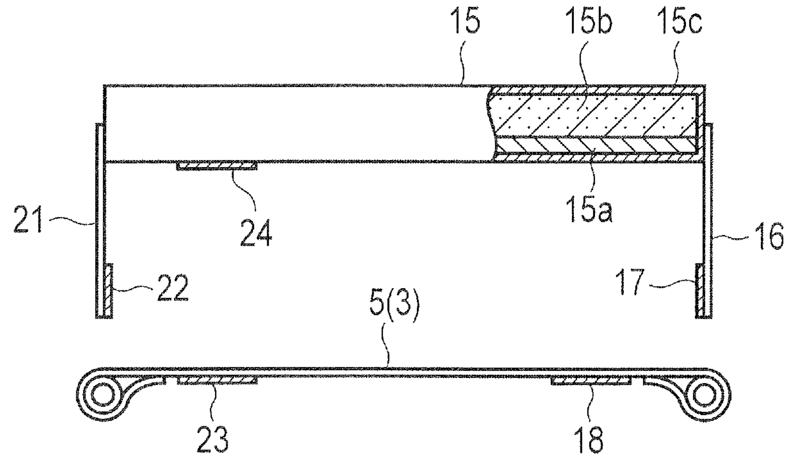
FIG. 3 is an exploded side view showing a sheet of the seat section and a seat cushion body which is detachably provided on the sheet.

A seat cushion body 15, as shown in FIG. 3, is placed on the seat section 5. The seat cushion body 15 is formed such that an elastic material 15*b*, such as a relatively hard urethane foam, is laid over an upper surface of a hard plate material 15*a*, and these are covered with an outer cloth 15*c*.

FIG. 3 is a side view showing the seat section 5. On a distal end side of the seat cushion body 15 that is placed on the seat section 5, one end of a first hold piece 16, which is formed of a flexible material, such as cloth, is coupled over the entire length in the width direction of the seat cushion body 15.

A first fastener 17, which is formed of cloth, is provided on an inner surface of the other end of the first hold piece 16. The other end portion of the first hold piece 16 is bent toward the lower surface side of the sheet 3 of the seat section 5, and thereby the first fastener 17 is detachably engaged with a second fastener 18 which is provided on a front end portion of the lower surface of the seat section 5.

Thereby, the seat, cushion body 15 can rotate with the front end portion thereof acting as a pivot in such a direction that the rear end portion thereof is raised, while the first hold piece 16 is being bent on the upper surface of the seat section 5.

In the meantime, one end of a second hold piece 21 is coupled to the rear end of the seat cushion body 15. A third fastener 22, which is formed of cloth, is provided on an inner surface of the other end of the second hold piece 21. The third fastener 22 can be detachably engaged with a fourth fastener 23 which is provided on a rear end portion of the lower surface of the seat section 5. When the third fastener 22 is engaged with the fourth fastener 23, the seat cushion body 15 is unrotatably held on the upper surface of the seat section 5.

The third fastener 22 is usually not engaged with the fourth fastener 23 so that the seat cushion body 15 may be rotatable on the upper surface of the seat section 5, and the third fastener 22 is engaged with and held by a fifth fastener 24 which is provided on a rear end portion of the lower surface of the seat cushion body 15.

Figure 2:
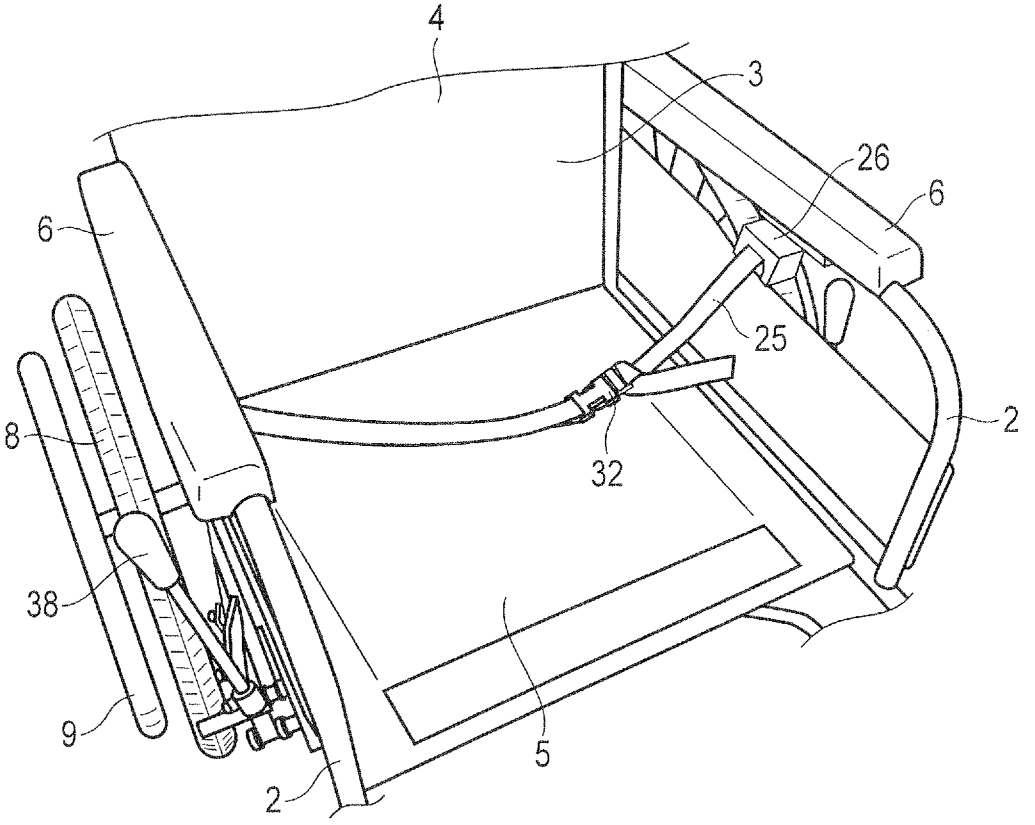
FIG. 2 is a perspective view showing a seat section of the wheelchair, as viewed from above.

As shown in FIG. 2, an intermediate portion of a strip-shaped working belt 25 is disposed over the upper surface of the seat section 5, on the lower surface side of the seat cushion body 15. Both end portions of the working belt 25 are supported by guide bodies 26 which are provided on the lower surfaces of the armrest portions 6, and are led out downward from both sides in the width direction of the conveyance body 1.

Figure 4:
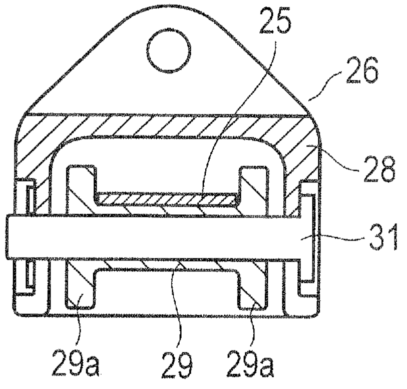
FIG. 4 is a cross-sectional view of a guide body.
Figure 5:
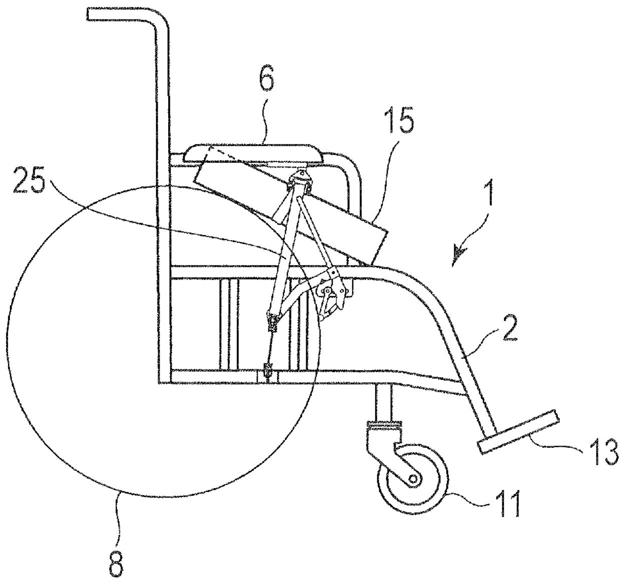
FIG. 5 is a side view of the wheelchair in a state in which the seat cushion body is rotated and raised.

As shown in FIG. 4 to FIG. 10, the guide body includes a swing member 28 which is provided via a support shaft 27 on the armrest portion 6 such that the swing member 28 can rotate in a hack-and-forth direction of the conveyance body 1. As shown in FIG. 4, the swing member 28 has an inverted-U-shaped cross section, and a guide roller 29, which constitutes a guide section, is rotatably supported by a support shaft 31 between both side portions of the swing member 28.

Collars 29*a* are provided on both sides in the axial direction of the guide roller 29. The length dimension between the paired collars 29*a* is set to be equal to or slightly greater than the width dimension of the working belt 25. Thereby, the working belt 25 can smoothly move while rotating the guide roller 29, without being disengaged from between the paired collars 29*a*.

As shown in FIG. 2, a length adjusting member 32 for adjusting the length of the working belt 25 is provided at an intermediate portion of the working belt 25, which is placed on the seat section 5. Thereby, the length of the working belt 25 can be set, for example, in accordance with the width dimension of the seat section 5.

Coupling members 33 are attached to terminal ends of both end portions which are engaged with the guide rollers 29 and are led out outward in the width direction of the conveyance body 1. A spring 34 serving as a resilient member is passed between the coupling member 33 and that part of the side frame 2 of conveyance body 1, which is located below the armrest portion 6.

The springs 34 urge, by their restoring force, both end portions of the working belt 25 which are guided by the guide rollers 29, namely led-out portions 25*a* which are led out outward from the guide rollers 29 on both sides in the width direction of the conveyance body 1, in a downward direction in the up-and-down direction of the conveyance body 1.

Thereby, the intermediate portion of the working belt 25, which is disposed on the seat section 5, is shifted upward. By this shifting, the seat cushion body 15, which is provided on the seat section 5, is rotated, with the front end portion thereof acting as a pivot, in such a direction that the rear end portion thereof is raised, as shown FIG. 5 and FIG. 6.

As shown in FIG. 5 to FIG. 10, the coupling member 33, which is provided at each of both ends of the working belt 25, is rotatably coupled to one end of a coupling link 36. The other end of the coupling link 36 is provided with a short pipe 37. A working lever 38 is coupled to the short pipe 37.

A lower end portion of the working lever 38 is rotatably attached via a support shaft 41 to a plate 39 which is secured to a part below the seat section 5 of the side frame 2. Thereby, the other end of the coupling link 36 is indirectly coupled in a rotatable fashion to the plate 39 via the working lever 38, namely, to the conveyance body 1.

One end of a first working link 42 is pivotally coupled to a lower end portion of the working lever 38, and the other end of the first working link 42 is pivotally coupled to one end of a V-shaped second working link 43. The other end of the second working link 43 is pivotally coupled to the plate 39.

One end of a shaft-shaped brake member 44 is coupled and secured to a bent portion of the second working link 43. The brake member 44 is provided such that the axial direction thereof agrees with the width direction of the conveyance body 1, so that the other end portion of the brake member 44 is opposed to the outer peripheral surface of the rear wheel 8.

In this embodiment, the plate 39, the first working link 42, the second working link 43 and a part of the working lever 38 constitute a working link mechanism 45.

Figure 6:
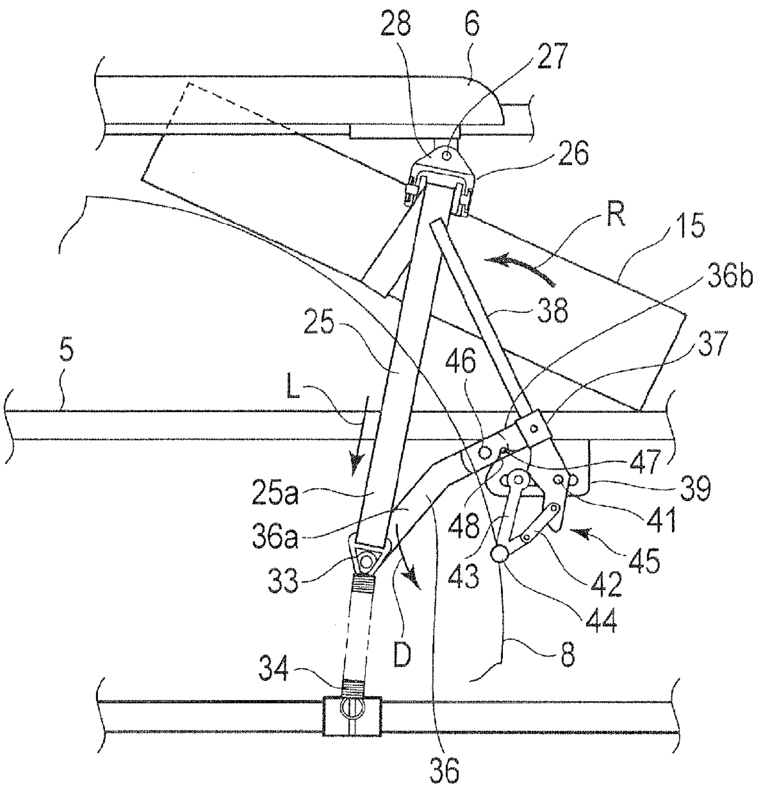
FIG. 6 is an enlarged view of a working belt and a working link mechanism when the seat cushion body is rotated and raised.

As shown in FIG. 6, at the time of the state in which the led-out portion 25*a* of the working belt 25 is pulled downward of the conveyance body 1, as indicated by an arrow L, by the restoring force of the spring 34, the seat cushion body 15 rotates into such a state that the rear end thereof is raised with the front end thereof acting as a pivot, and the coupling link 36 rotates, as indicated by an arrow D, in such a direction that one end thereof, which is coupled to the coupling member 33, is shifted downward.

Thereby, the working lever 38 rotates rearward of the conveyance body 1, as indicated by an arrow R. By this rotation, the brake member 44, which is projectingly provided on the bent portion of the second working link 43, shifts to come in pressure contact with the outer peripheral surface of the rear wheel 8.

Figure 7:
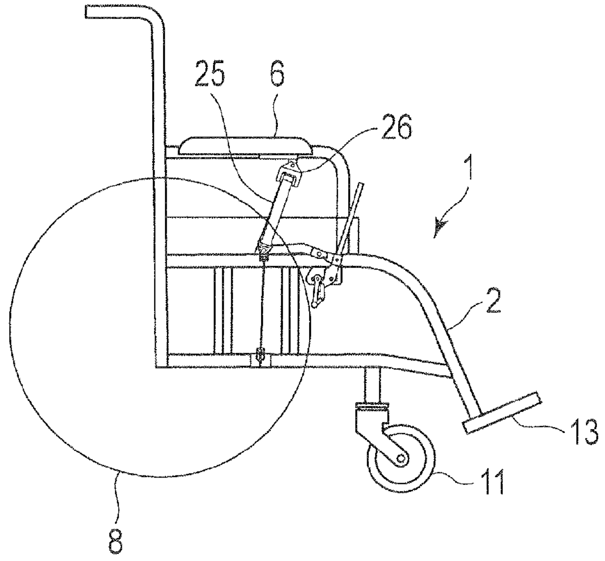
FIG. 7 is a side view of the wheelchair in a state in which the seat cushion body is substantially horizontally fallen.
Figure 8:
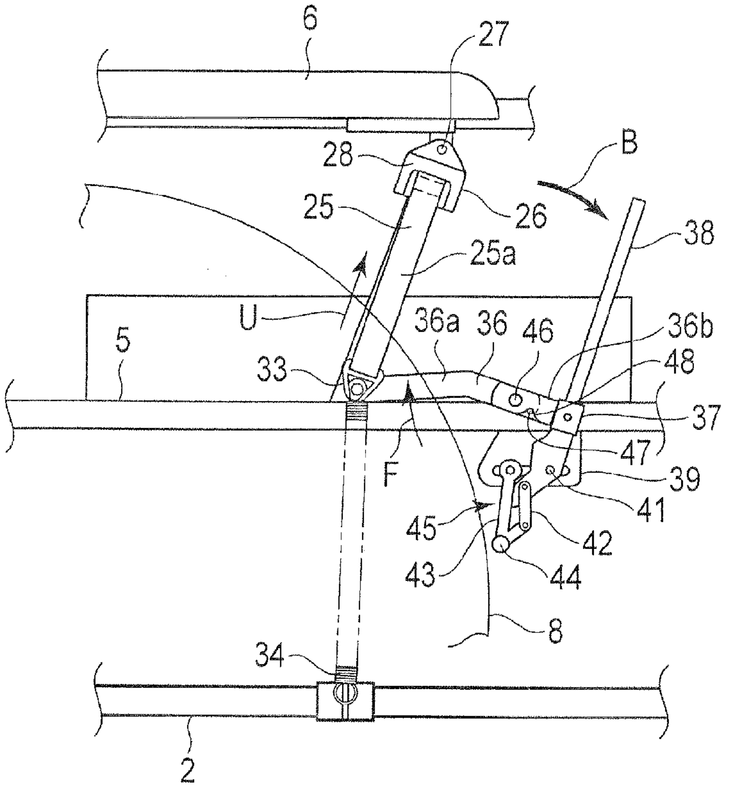
FIG. 8 is an enlarged view of the working belt and the working link mechanism when the seat cushion body is substantially horizontally fallen.

As shown in FIG. 7 and FIG. 8, when the user sits on the seat cushion body 15, the seat cushion body 15 rotates, under the weight of the user, in such a direction that the seat cushion body 15 falls, with the front end thereof acting as a pivot, from the state in which the rear end thereof is raised. When the seat cushion body 15 rotates in such a direction that the seat cushion body 15 falls, the intermediate portion of the working belt 25, which is disposed on the lower surface side of the seat cushion body 15, is pushed downward. Hence, the led-out portion 25a of the working belt 25, which is coupled to the spring 34, shifts in a direction of rising, as indicated by an arrow U, against the restoring force of the spring 34.

When both ends of the working belt 25 rise, the coupling link 36 rotates in interlock with the rising of both ends of the working belt 25. Specifically, one end of the coupling link 36, which is coupled to the terminal end of the working belt 25, rotates upward, as indicated by an arrow F.

Thereby, the working lever 38 rotates in a direction toward the front side of the conveyance body 1, as indicated by an arrow B, which is opposite to the direction in the above-described case. Accordingly, the first and second working links 42 and 43 move in interlock with this rotation, and the brake member 44, which is provided at the bent portion of the second working link 43, shifts in a direction away from the outer peripheral surface of the rear wheel 8, as shown in FIG. 8. In short, the braking of the rear wheel 8 is released.

The length dimension of the coupling link 36 is set such that the led-out portion 25a of the working belt 25, which is led out outward from the guide roller 29 in the width direction of the conveyance body 1, may be held in a state in which the led-out portion 25a is inclined obliquely downward toward the rear side of the conveyance body 1, either in the state shown in FIG. 6 in which the seat cushion body 15 is rotated in the direction of rising, or in the state shown in FIG. 8 in which the seat cushion body 15 is rotated in the direction of falling.

The led-out portion 25a of the working belt 25 is inclined obliquely downward toward the rear side of the conveyance body 1, and thereby the swing member 28 of the guide body 26 including the guide roller 29, which is engaged with the led-out portion 25a, swings in the same direction as the led-out portion 25a.

Specifically, since the guide body 26 is swingably supported on the conveyance body 1 by the support shaft 27, the led-out portion 25a of the working belt 25 from the guide body 26 is led out downward of the conveyance body 1 and is inclined obliquely downward of the conveyance body 1.

Thereby, compared to the case where the led-out portion 25a is led out vertically downward from the guide roller 29 of the guide body 26, the angle of inclination of the led-out portion 25a becomes closer to the angle of rotation of the seat cushion body 15 which rotates in such a direction that the rear end thereof rises or falls over the upper surface of the seat section 5, with the front end thereof acting as a pivot.

When the angle of inclination of the led-out portion 25a is closer to the angle of rotation of the seat cushion body 15, the degree of pulling of the led-out portion 25a in the back-and-forth direction of the conveyance body 1 decreases when the seat cushion body 15 rotates.

Thereby, the working belt 25 smoothly moves while rotating the guide roller 29. Specifically, it is possible to prevent the working belt 25 from being displaced on the guide roller 29 in the axial direction of the guide roller 29, and failing to smoothly move.

The coupling link 36 includes a first link portion 36a and a second link portion 36b which are pivotally attached via a support shaft 46. An engaging pin 47 is projectingly provided on an end portion of the first link portion 36a, and a recess portion 48 which is engaged with the engaging pin 47 is formed at that end portion of the second link portion 36b, which is located on the engaging pin 47 side.

Figure 9:
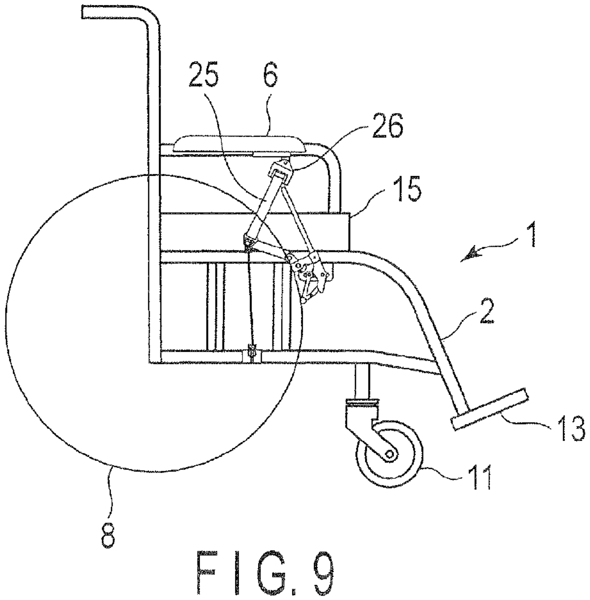
FIG. 9 is a side view of the wheelchair in a state in which a coupling link is bent in the state in which the seat cushion body is substantially horizontally fallen.
Figure 10:
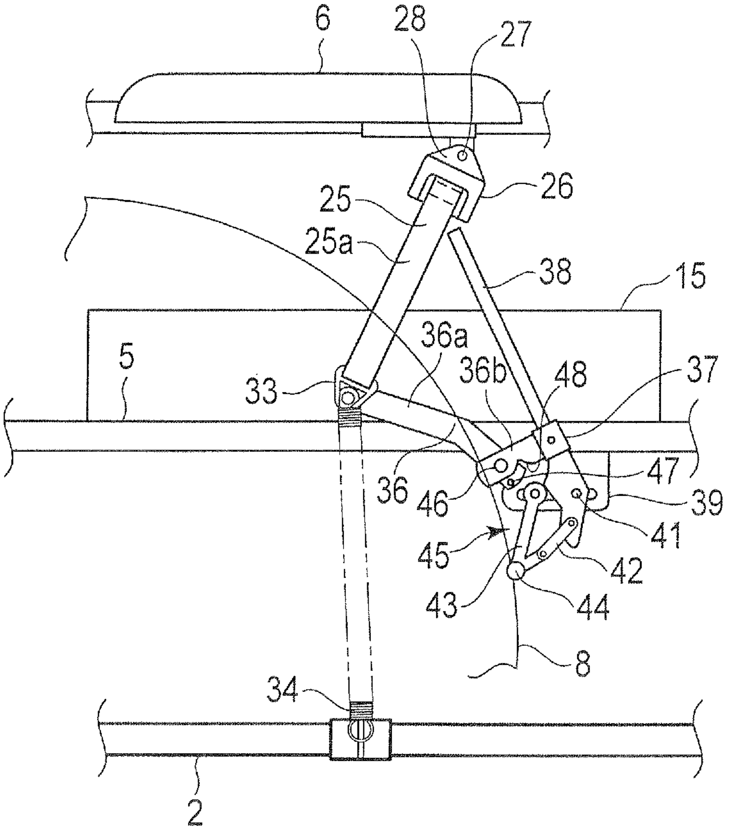
FIG. 10 is an enlarged view of the working belt and the working link mechanism when the seat cushion body is substantially horizontally fallen.

By the engagement between the engaging pin 47 and the recess portion 48, the coupling link 36 is kept in a bent shape of Japanese character "へ" (HE). As shown in FIG. 7 and FIG. 8, when the user sits and the seat cushion body 15 is in the state in which the seat cushion body 15 has fallen and the brake member 44 is separated from the rear wheel 8, when the working lever 38 is rotated toward the rear side of the conveyance body 1, the recess portion 48 of the second link portion 36b is disengaged from the engaging pin 47 of the first link portion 36a, as shown in FIG. 9 and FIG. 10, and the second link portion 36b rotates upward. Thus, the coupling link 36 is bent in a V shape, or a downwardly projecting shape.

Specifically, since the user can rotate the working lever 38 toward the rear side of the conveyance body 1 in the state in which the user sits on the seat cushion body 15, the first and second working links 42 and 43 can be operated by this rotation and the brake member 44 can be put in pressure contact with the rear wheel 8, thereby to brake the rear wheel 8. In short, when the user sits on the seat section 5, the user can apply the brake to make the wheelchair immovable.

In the meantime, the guide body 26 is swingably provided on the armrest portion 6 so that the guide body 26 may swing together with the led-out portion 25a of the working belt 25. However, the guide body 26 may be fixedly provided on the armrest portion 6 at a predetermined angle of inclination, and thereby the led-out portion 25a may be held in the state in which the led-out portion 25a is inclined obliquely toward the rear side of the conveyance body 1. Specifically, by setting the length dimension of the coupling link 36, the led-out portion 25a can be held in the state in which the led-out portion 25a is inclined obliquely toward the rear side of the conveyance body 1.

According to the wheelchair having the above-described structure, when the user does not sit on the seat section 5, both end portions of the working belt 25 are pulled by the tensile force of the spring 34, and thereby the rear end of the seat cushion body 15 is raised, with the front end thereof acting as a pivot, as shown in FIG. 6. At this time, the brake member 44 is put in pressure contact with the outer peripheral surface of the rear wheel 8, and the wheelchair is in the immovable state.

When the user sits on the seat cushion body 15 which is rotated and raised, the seat cushion body 15 horizontally falls under the weight of the user, as shown in FIG. 8. Thereby, the led-out portion 25a of the working belt 25 moves upward against the restoring force of the spring 34, and the coupling link 36 is rotated in the direction F in which one end thereof rises, by the led-out portion 25a of the working belt 25.

When the coupling link 36 rotates in the direction F of rising, the first and second working links 42 and 43 are moved by this rotation, the brake member 44, which is provided on the second working link 43, is separated from the outer peripheral surface of the rear wheel 8, and the braking of the rear wheel 8 is released. Thereby, the conveyance wheel is made movable.

When the user sits on the seat cushion body 15 that is rotated and raised and the seat cushion body 15 rotates in the direction of falling, the led-out portion 25a of the working belt 25 is moved along the guide roller 29 of the guide body 26, which is provided on the armrest portion 6, by the coupling link 36 that is coupled to the coupling member 33 provided at the terminal end of the working belt 25, in the state in which the led-out portion 25a is held at an angle of inclination in an obliquely downward direction toward the rear side of the conveyance body 1. At this time, the guide body 26 swings such that the axis of the guide roller 29 is set at an angle perpendicular to the direction of movement of the working belt 25.

Accordingly, when the seat cushion body 15 rotates with its front end acting as a pivot, the direction of rotation of the seat cushion body 15 substantially agrees with the direction U of movement of the led-out portion 25*a* of the working belt 25. Hence, force hardly acts on the working belt 25, which is moved by the rotation of the seat cushion body 15, in the width direction crossing the direction of movement of the working belt 25. Therefore, the working belt 25 is not easily displaced on the guide roller 29 in the axial direction of the guide roller 29, and the working belt 25 is smoothly moved.

In the meantime, the led-out portion 25*a* of the working belt 25 is configured to be guided at an angle of inclination in an obliquely downward toward the rear side of the conveyance body 1, by the guide roller 29 and the coupling link 36 that is coupled to the coupling member 33 provided at the terminal end of the working belt 25. However, even if the led-out portion 25*a* is configured to be simply guided in the downward direction of the conveyance body 1, the working belt 25 can relatively smoothly be moved on the guide roller 29 when the seat cushion body 15 is rotated.

With the smooth movement of the working belt 25, the first and second working links 42 and 43 also smoothly move via the coupling link 36. Accordingly, the braking state by the brake member 44 is also smoothly released.

The working belt 25 can also smoothly be moved when the user rises from the horizontally fallen seat cushion body 15 and the seat cushion body 15 rotates and rises with the front end thereof acting as a pivot, as shown in FIG. 6, as in the case when the seat cushion body 15 has fallen as shown in FIG. 8. Thus, at this time, the rear wheel 8 can be surely and smoothly braked by the brake member 44.

The coupling link 36, which couples the coupling member 33 at the terminal end of the working belt 25 and the working lever 38, is configured to be bendable at an intermediate portion thereof. Thus, as shown in FIG. 10, the coupling link 36 can be bent by rotating the working lever 38 toward the rear side of the conveyance body 1 in the state in which the user sits on the seat section 5 and the seat cushion body 15 horizontally falls.

Thereby, in the state in which the user sits on the seat cushion body 15 on the seat section 5, the brake member 44 can be put in pressure contact with the outer peripheral surface of the rear wheel 8 which is in the rotatable state, and the brake can be applied.

Therefore, even in the state in which the user is sitting, the wheelchair can be braked and prevented from moving, for example, when a helper goes away from the wheelchair or leaves the wheelchair.

Although not illustrated, in the first embodiment, a wire for a rotational operation of the working lever 38 may be guided to the back section 4 side of the conveyance body 1, and a push/pull operation of the wire may be performed by an operation handle at the part of the back section 4. Thereby, when the helper handles the wheelchair 1, the helper can easily operate the working lever 38.

Example 2

Figure 11:
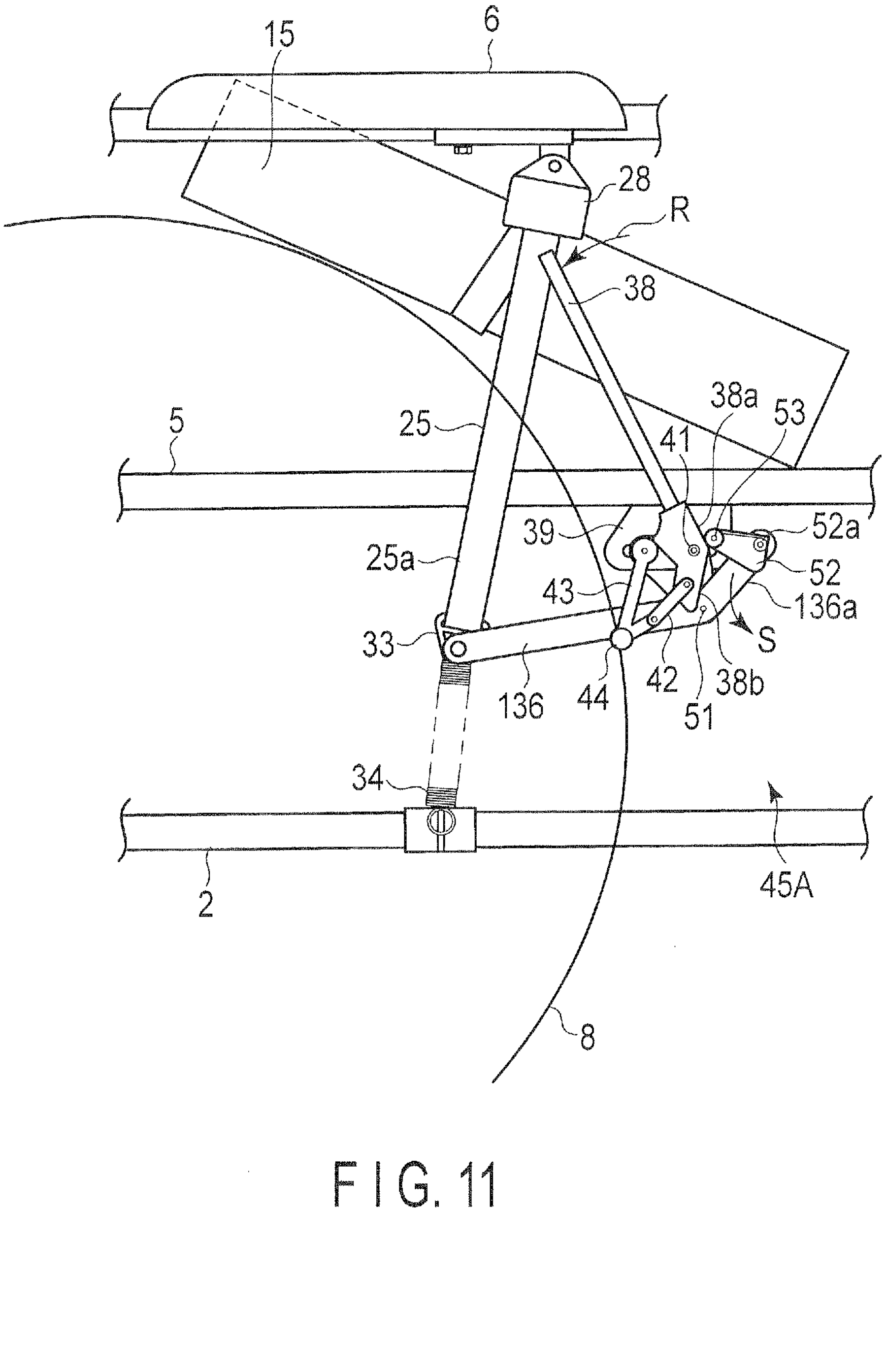
FIG. 11 is an enlarged view of a working belt and a working link mechanism in a second embodiment of the invention, when the seat cushion body is rotated and raised and a rear wheel is locked by a brake member.
Figure 12:
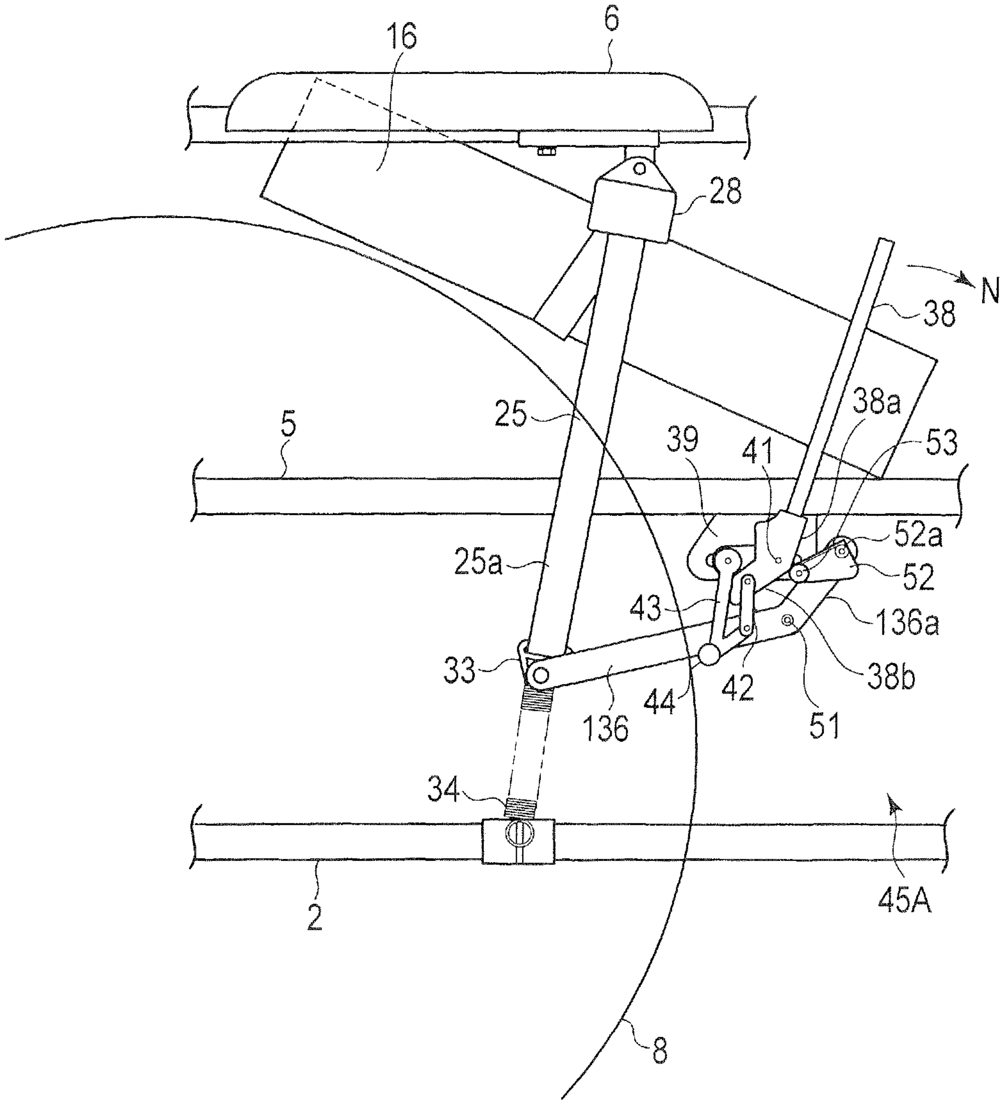
FIG. 12 is an enlarged view of the working belt and working link mechanism when the locked state of the rear wheel by the brake member is released in the state in which the seat cushion body is rotated and raised.
Figure 13:
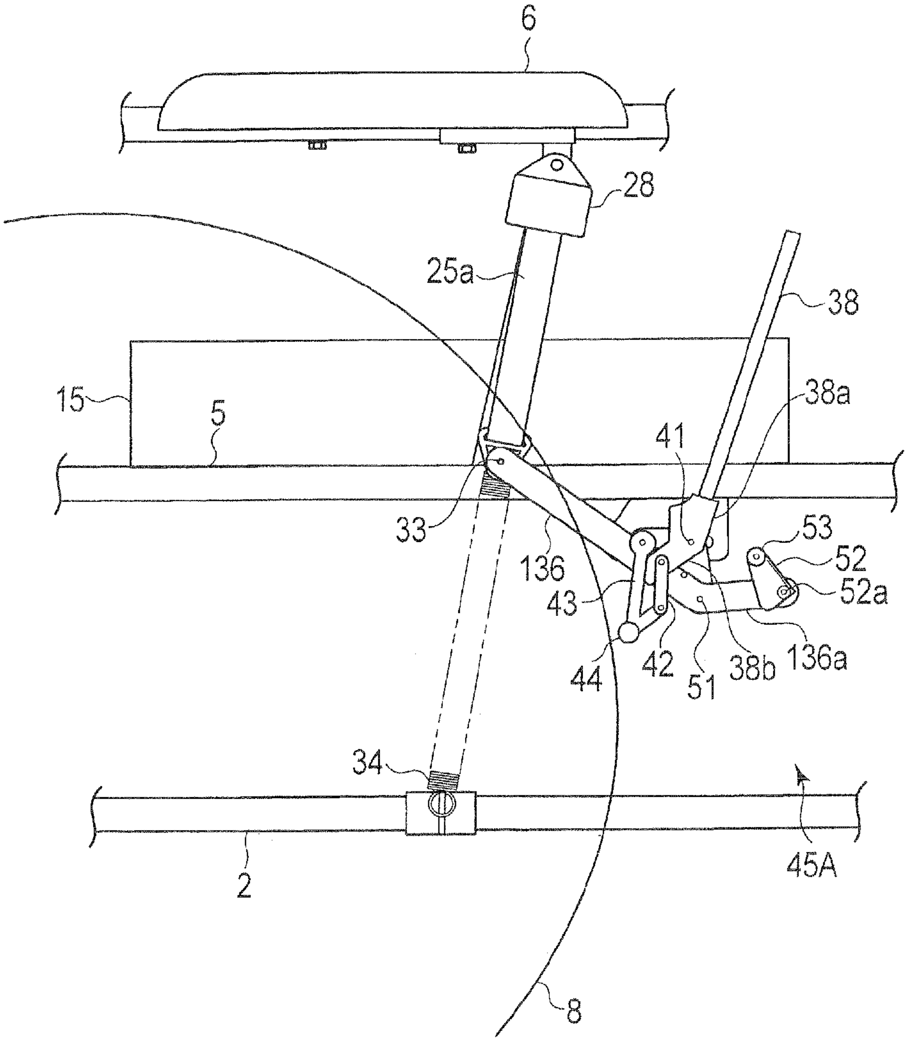
FIG. 13 is an enlarged view of the working belt and working link mechanism when the locked state of the rear wheel by the brake member is released in the state in which the seat cushion body is substantially horizontally fallen.

FIG. 11 to FIG. 13 show a second embodiment of the invention, which illustrates a modification of the working link mechanism. The same parts as in the first embodiment are denoted by like reference numerals, and a description thereof is omitted.

As shown in FIG. 11, a working link mechanism 45A of the second embodiment includes a coupling link 136 having one end pivotally attached to the coupling member 33 of the led-out portion 25*a* of the working belt 25. A bent portion 136*a*, which is bent upward, is formed at the other end portion of the coupling link 136.

The part of the bent portion 136*a* is pivotally attached via a support shaft 51 to a plate 39 which is provided on a lower surface of the seat section 5 of the conveyance body 1, with the plate surface of the plate 39 being vertically disposed. One end of pressing piece 52 is provided at a distal end portion of the bent portion 136*a* of the coupling link 136, such that the one end of the pressing piece 52 is resiliently urged in a direction of arrow S by a support shaft 52*a* which is composed of a torsion bar. A roller 53 serving as a contact member is rotatably supported on the other end of the pressing piece 52.

In the meantime, the pressing piece 52 may be fixedly provided at the distal end portion of the bent portion 136*a*.

The structure of the second embodiment is the same as the structure of the first embodiment in that the lower end portion of working lever 38 is pivotally attached to the plate 39 by the support shaft 41, that one end of the first working link 42 is pivotally attached to the lower end portion of the working lever 38 and one end of the V-shaped second working link 43 is pivotally attached to the other end of the first working link 42, that the other end of the second working link 43 is pivotally attached to the above-mentioned plate, and that one end of the shaft-shaped brake member 44 is coupled and secured to the bent portion of the second working link 43.

In the meantime, both the working lever 38 and the coupling link 136 are rotatably coupled to the plate 39 but, unlike the first embodiment, the lower end of the working lever 38 is not coupled to the other end of the coupling link 136.

As shown in FIG. 11, when the user rises and the seat cushion body 15 rises so that the working lever 38 rotates in the direction of arrow R, the brake member 44 comes into contact with the outer peripheral surface of the rear wheel 8 and locks the rotation of the rear wheel 8.

Further, the roller 53, which is provided on the pressing piece 52, is resiliently brought into contact with an upper inclined surface 38*a*, which is one of two inclined surfaces, an upper inclined surface 38*a* and a lower inclined surface 38*b*, of a lower end portion of the working lever 38, thereby preventing the working lever 38 from freely returning in a direction opposite to the direction of arrow R. Specifically, the pressing piece 52 resiliently holds the locked state of the rear wheel 8 by the brake member 44.

According to this structure, when the user rises from the seat cushion body 15 from the state shown in FIG. 13 in which the user sits and the seat cushion body 15 is horizontally fallen, both end portions of the working belt 25 are pulled downward by the spring 34, as shown in FIG. 11. Thus, the seat cushion body 15 rotates in such a direction that the rear end thereof is raised with the front end thereof acting as a pivot.

Thereby, the coupling link 136 rotates, from the state of FIG. 13, in such a direction that one end of the coupling link 136, which is coupled to the working belt 25, is lowered as shown in FIG. 11. Thus, the roller 53 of the pressing piece 52, which is provided at the other end of the coupling link 136, resiliently abuts upon the upper inclined surface 38*a* of the lower end portion of the working lever 38.

When the roller 53 resiliently abuts upon the upper inclined surface 38*a* of the lower end portion of the working lever 38, the working lever 38 rotates in the direction of arrow R in FIG. 11. By the rotation of the working lever 38, the first and second working links 42 and 43 move and the brake member

44 comes into contact with the outer peripheral surface of the rear wheel 8, thereby locking the rotation of the rear wheel 8.

FIG. 12 shows the state in which the working lever 38 is rotated in a direction of arrow N in FIG. 12 which is opposite to the direction of arrow R, from the state shown in FIG. 11 in which the user rises from the seat cushion body 15 and the rear wheel 8 is locked.

When the working lever 38 is rotated in the direction of arrow N, the first and second working links 42 and 43 move in interlock with this rotation, and the brake member 44 moves away from the outer peripheral surface of the rear wheel 8. Thus, the locked state of the rear wheel 8 is released. At this time, the roller 53 of the pressing piece 52 moves from the upper inclined surface 38*a* of the lower end portion of the working lever 38 to the lower inclined surface 38*b*, and reliantly holds the working lever 38, thereby preventing the working lever 38 from freely rotating in a direction opposite to the direction of arrow N. In short, the unlocked state of the rear wheel 8 is maintained.

FIG. 13 shows the state in which the user sits on the seat cushion body 15, in the state shown in FIG. 12 in which the rear end side of the seat cushion body 15 is raised. When the user sits on the seat cushion body 15, the lid-out portions 25*a* on both sides of the working belt 25 are pulled upward against the restoring force of the springs 34.

Thereby, the coupling link 136 rotates in such a direction that one end side thereof connected to the coupling member 33 is raised, with the support shaft 51 acting as a pivot. At this time, the working lever 38 has already been rotated in the direction of arrow N, so that the locked state of the rear wheel 8 by the brake member 44 is released.

Thus, the working lever 38 does not rotate in interlock with the rotation of the coupling link 136. However, by the rotation of the coupling link 136, the roller 53 of the pressing piece 52 moves away from the lower inclined surface 38*b* of the lower end portion of the working lever 38.

On the other hand, in the state shown in FIG. 11 in which the rear wheel 8 is locked by the brake member 44 and the rear end side of the seat cushion body 15 is raised, when the user sits and the seat cushion body 15 is rotated in the direction of falling, one end of the coupling link 136 rotates in the direction of rising and the first and second working links 42 and 43 rotate in interlock with this rotation.

Thereby, the working lever 38 rotates, from the state shown in FIG. 11, in the direction opposite to the direction of arrow 2, and the locked state of the rear wheel 8 by the brake member 44 is released, as shown in FIG. 13.

In the state shown in FIG. 13 in which the user sits, when the working lever 38 is rotated in the direction of arrow R shown in FIG. 11, the first and second working links 42 and 43 move in interlock with this rotation. Thus, the rear wheel 8 is locked by the brake member 44.

Specifically, also with the working link mechanism 45A having the structure illustrated in the second embodiment, the rear wheel 8 can be locked and unlocked as in the first embodiment.

Example 3

Figure 14:
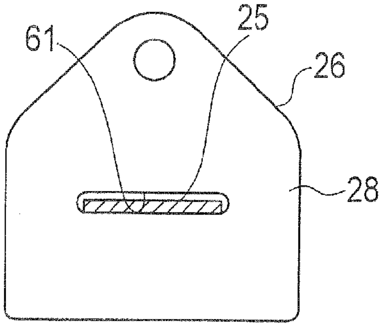
FIG. 14 is a front view of a guide body according to a third embodiment of the invention.

FIG. 14 shows a modification of the guide body 26 according to a third embodiment of the invention. In this embodiment, the guide roller 29 is not provided in the guide body 26. Instead, a flat-shaped through-hole 61 for passing the working belt 25 is provided in the swinging member 28 of the guide body 26. In the through-hole 61, a surface, which is brought into contact with the working belt 25, is formed as a convex arcuate surface.

In the case where the through-hole 61 is formed in the swinging member 28 of the guide body 26, the guide body 26 may be swingably provided on the armrest portion 6, or the guide body 26 may be fixedly provided such that the through-hole 61 is inclined to be raised at a predetermined angle toward the rear side of the conveyance body 1.

Although not illustrated, without providing the swing member 28 on the conveyance body 1, a through-hole may be formed in the armrest portion 6 and the working belt 25 may be passed through the through-hole. In this case, if the through-hole is formed such that the through-hole is inclined to be raised toward the rear side of the conveyance body 1, the working belt 25, which is passed through the through-hole, can be led out at an angle in an obliquely downward direction.

Besides, in the first embodiment, the guide roller 29 is provided in the guide body 26. However, the guide roller 29 may be replaced with a guide member which is configured such that a surface which comes into contact with the working belt 25 is formed as an arcuate surface.

Example 4

Figure 15:
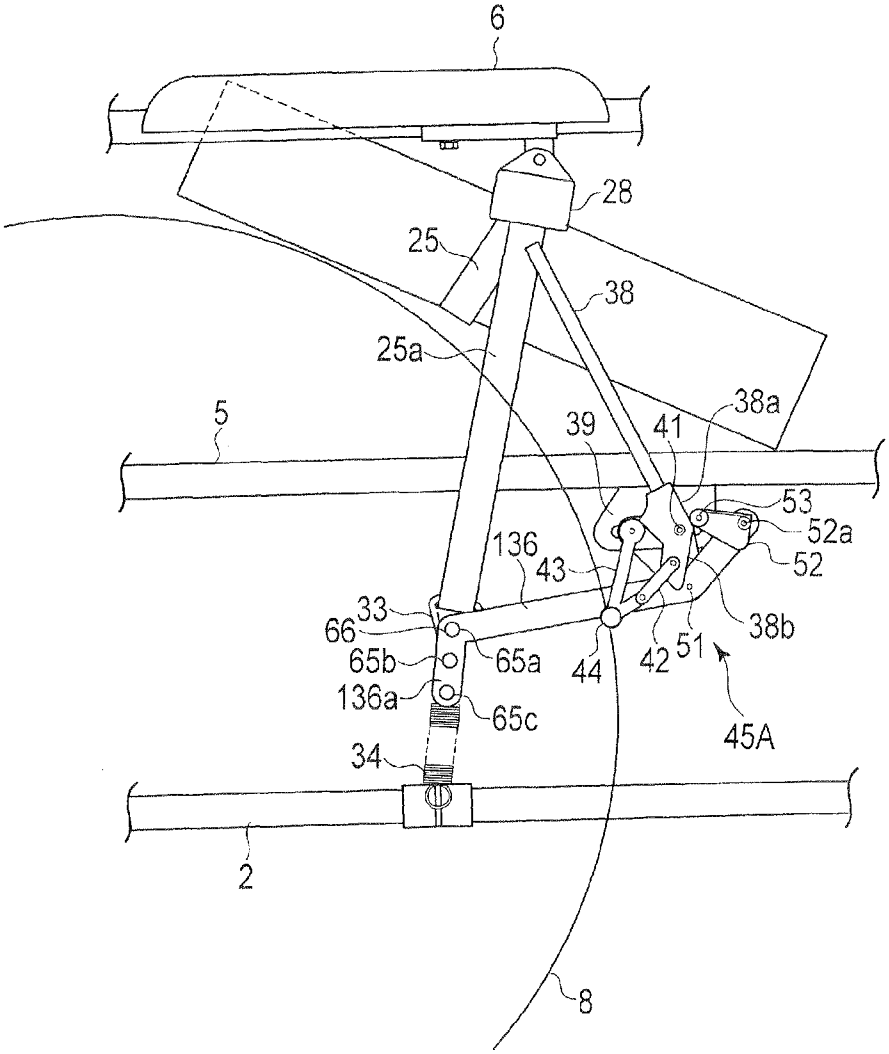
FIG. 15 is an enlarged view of a working belt and a working link mechanism of a wheelchair in a fourth embodiment of the invention.

FIG. 15 shows a fourth embodiment. In this embodiment, the length adjustment of the working belt 25 can be performed by, instead of the length adjusting member 32 shown in FIG. 2, the coupling links 136 which are coupled to the coupling members 33 shown in the second embodiment, which are provided at both ends of the working belt 25.

Specifically, a coupling portion 136*a*, which is bent downward, is formed at one end of the coupling link 136.

A plurality of coupling holes, namely three coupling holes 65*a* to 65*c* in this embodiment, are formed in the coupling portion 136*a* in the up-and-down direction. The coupling member 33 is selectively coupled to one of the three coupling holes 65*a* to 65*c* by one pin 66. The pin 66 may be replaced with a screw.

In this embodiment, the coupling member 33 is coupled to the uppermost coupling hole 65*a* of the three coupling holes 65*a* to 65*c*. Thereby, the working belt 25 can be used in the longest state. If the coupling member 33 is coupled to the lowermost coupling hole 65*c*, the working belt 25 can be used in the shortest state.

Specifically, the length of the working belt 25 can be set by the three coupling holes 65*a* to 65*c* provided in the bent portion 136*a* of the coupling link 136, in accordance with the width dimension of the seat section 5 or the tension which is applied to the working belt 25.

Example 5

Figure 16:
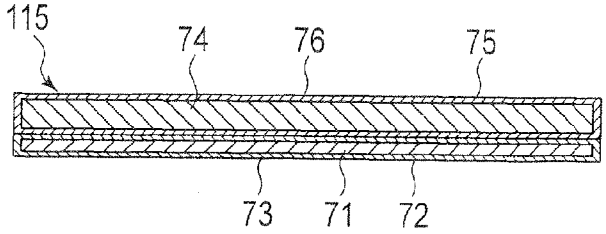
FIG. 16 is a vertical cross-sectional view of a seat cushion body according to a fifth embodiment of the invention.

FIG. 16 shows a fifth embodiment of the invention, which illustrates a modification of the seat cushion body. A seat cushion body 115 shown in this embodiment is configured such that a base part 73, which is formed by covering a hard plate material 71 with an outer cloth 72, and a cushion part 76, which is formed by covering an elastic material 74 with an outer cloth 75, are detachably stacked by a cloth tape (not shown).

Thereby, when settling due to use has occurred in the cushion part 76, the cushion part 76 can be removed from the base part 73 and can be replaced.

Example 6

Figure 17:
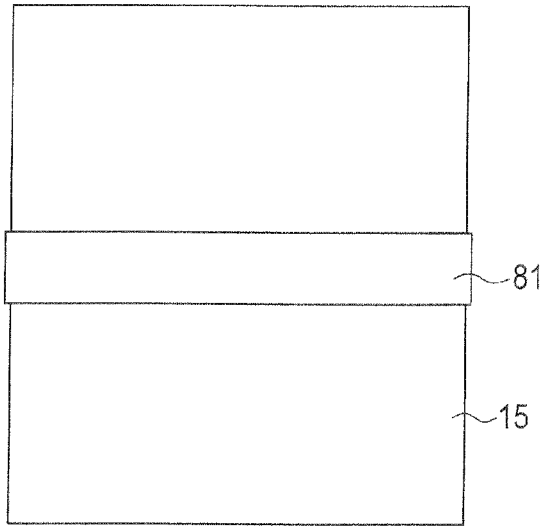
FIG. 17 is a bottom view of a seat cushion body according to a sixth embodiment of the invention.
Figure 18:
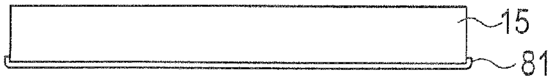
FIG. 18 is a side view of the seat cushion body shown in FIG. 17.

FIG. 17 and FIG. 18 show a sixth embodiment of the invention, which illustrates a modification of the seat cushion body. In this embodiment, a reinforce tape 81 having a width dimension, which is equal to or slightly greater than the width dimension of the working belt 25, is detachably provided, by a sheet-shaped fastener (not shown), on that part of the lower surface of the seat cushion body 15, which corresponds to the working belt 25.

Thereby, even if the lower surface of the seat cushion body 15 is worn by the working belt 25, the lower surface of the seat cushion body 15 can be prevented from being damaged. If the reinforcement tape 81 has been damaged by long-time use, the reinforcement tape 81 can be replaced.

When the reinforcement tape 81 is detachably attached to the lower surface of the seat cushion body 15 by sheet-shaped fasteners, a male-side sheet-shaped fastener is provided on the reinforcement tape 81 and a female-side sheet-shaped fastener is provided on the lower surface of the seat cushion body 15.

The female-side sheet-shaped fastener has a loop-like structure, and is softer than the male-side sheet-shaped fastener which has a hook-like structure. Thus, even if the reinforcement tape 81 is attached to the lower surface of the seat cushion body 15 at a position displaced from the correct attachment position and the female-side sheet-shaped fastener is exposed from the reinforcement tape 81, it is possible to prevent the working belt 25 or seat section 5 from being damaged by the female-side sheet-shaped fastener.

Example 7

Figure 19:
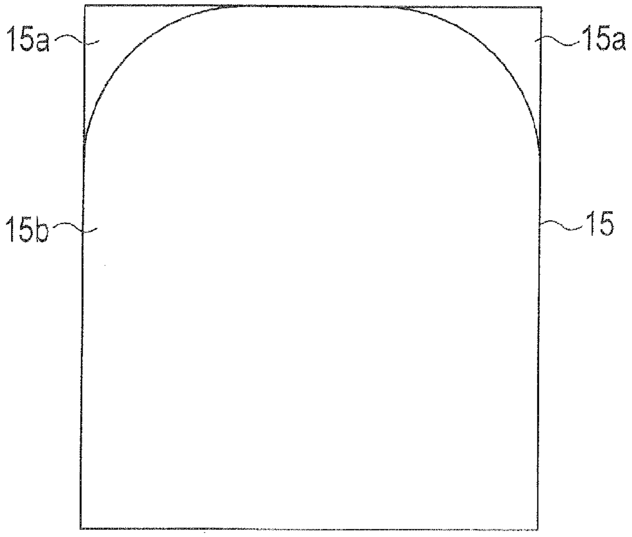
FIG. 19 is a plan view of a seat cushion body according to a seventh embodiment of the invention.

FIG. 19 shows a seventh embodiment of the invention, which illustrates a modification of the seat cushion body. In this embodiment, two rear-side corner portions and the other part on the upper surface of the seat cushion body 15 are color-coded so as to be discriminated. For example, the two rear-side corner portions are formed by first color-coded portions 15*a* of yellow, and the other part is formed by a second color-coded portion 15*b* of black.

Thereby, when a user, in particular, an aged person, sits, visual recognition is possible so that the buttocks may be placed on the second color-coded portion 15*b*. Therefore, it is possible to prevent the user from sitting in an unstable state on the first color-coded portions 15*a*, i.e. the rear-side corner portions on the upper surface of the seat cushion body 15.

What is claimed is:

1. A brake-equipped wheelchair including a brake member configured to stop rotation of rear wheels, comprising:

a conveyance body including a back section and a seat section which is provided with armrest portions on both sides;

front wheels and rear wheels configured to movably support the conveyance body;

a seat cushion body provided on the seat section such that the seat cushion body is rotatable, with a front end portion thereof acting as a pivot;

a working belt having an intermediate portion disposed on a lower surface side of the seat cushion body;

guide sections provided on the armrest portions and configured to guide both end portions of the working belt downward from both outer sides of the conveyance body;

resilient members coupled at one end to terminal ends of the working belt and coupled at the other end to parts below the armrest portions of the conveyance body, the resilient members being configured to resiliently pull both end portions of the working belt downward;

coupling links coupled at one end to the terminal ends of the working belt and rotatably coupled at the other end to the conveyance body, the coupling links being configured to rotate in accordance with rotation of the seat cushion body when the seat cushion body rotates with a front end portion thereof acting as a pivot and both end portions of the working belt move in an up-and-down direction; and a working link mechanism provided in a manner to operate in interlock with the rotation of a respective one of the coupling links, the working link mechanism being configured to shift the brake member in accordance with a direction of rotation of the coupling link into such a state that the brake member is separated from its respective rear wheel to release braking, or into such a state that the brake member is brought into contact with its respective rear wheel to apply braking;

wherein each guide section is formed in a guide body which is provided on a respective one of the armrest portions in a manner to be swingable in a back-and-forth direction of the conveyance body.

2. The brake-equipped wheelchair of claim 1, wherein the guide sections are configured to guide both end portions of the working belt at an angle of an obliquely downward direction toward a rear side of the conveyance body, and the coupling links are configured to hold both end portions of the working belt, together with the guide sections, at the angle of the obliquely downward direction toward the rear side of the conveyance body.

3. The brake-equipped wheelchair of claim 1, wherein each guide body includes a swing member which is provided on its respective armrest portion in a manner to be swingable in the back-and-forth direction of the conveyance body, and the guide section comprises a guide roller which is rotatably provided in the swing member.

4. The brake-equipped wheelchair of claim 1, wherein each guide body includes a swing member which is provided on its respective armrest portion, and the guide section comprises a through-hole which is formed in the swing member.

5. The brake-equipped wheelchair of claim 1, wherein the working link mechanism includes a working lever which is rotatably provided on a side part of the conveyance body and is connected to the other end of the coupling link, and a plurality of working links configured to operate in accordance with rotation of the working lever in the back-and-forth direction of the conveyance body, thereby shifting the brake member in a direction in which the brake member comes into contact with its respective rear wheel and in a direction in which the brake member is separated from its respective rear wheel, and wherein each coupling link is configured to be bendable at an intermediate portion thereof, and the working lever is capable of being rotated rotatable in a direction in which the brake member is separated from its respective rear wheel, by its respective coupling link being bent in a state in which the brake member is in contact with its respective rear wheel.

6. The brake-equipped wheelchair of claim 1, wherein the working link mechanism includes a working lever which is rotatably provided on a side part of the conveyance body, a plurality of working links configured to operate in accordance with rotation of the working lever in the back-and-forth direction of the conveyance body, thereby shifting the brake member in a direction in which the brake member comes into contact with its respective rear wheel and in a direction in which the brake member is separated from its respective rear wheel, and a pressing piece which is provided with a contact member at a distal end thereof and is attached to the other end of its respective coupling link, and wherein when the seat cushion body rotates in a direction of rising from a state in which the seat cushion body has fallen, with the front end portion thereof acting as a pivot, and the coupling link rotates in interlock with the rotation of the seat cushion body in a direction in which the one end of the coupling link is lowered, the contact member comes into contact with a lower end portion of the working lever to rotate the working lever, and the brake member abuts on its respective rear wheel to lock the rear wheel.

7. The brake-equipped wheelchair of claim 6, wherein the pressing piece is rotatably provided on the other end of the coupling link in a resilient manner.

8. The brake-equipped wheelchair of claim 6, wherein the contact member is separated from the lower end portion of the working lever when the seat cushion body has fallen, and the contact member comes into contact with the lower end portion of the working lever when the seat cushion body rotates in a direction in which a rear end portion thereof is raised with the front end portion thereof acting as a pivot.

9. The brake-equipped wheelchair of claim 1, wherein the seat cushion body has a distal end portion rotatably coupled to the seat section, and a rear end portion provided with a hold member configured to hold the seat cushion body such that the seat cushion body is unable to rotate and rise over the seat section, with the distal end portion thereof acting as a pivot, when a load on the seat cushion body is removed.

10. The brake-equipped wheelchair of claim 1, wherein one end portion of each coupling link is provided with a coupling portion which is bent downward, and the coupling portion is provided with a plurality of coupling holes along an up-and-down direction, and wherein coupling members provided at each of both end portions of the working belt are selectively attachable to the coupling holes.

11. The brake-equipped wheelchair of claim 1, wherein the seat cushion body comprises a base part in which a hard plate material is contained, and a cushion part in which an elastic material is contained, the cushion part being detachably provided on an upper surface of the base part.

12. The brake-equipped wheelchair of claim 1, wherein a part of a lower surface of the seat cushion body, which corresponds to a position at which the working belt is provided, is provided with a reinforcement tape configured to prevent the lower surface of the seat cushion body from being directly worn by the working belt.

13. The brake-equipped wheelchair of claim 1, wherein an upper surface of the seat cushion body is provided with color-coded portions for enabling a user to visually recognize a part of the seat cushion body on which to sit.

* * * * *